Patented July 31, 1945

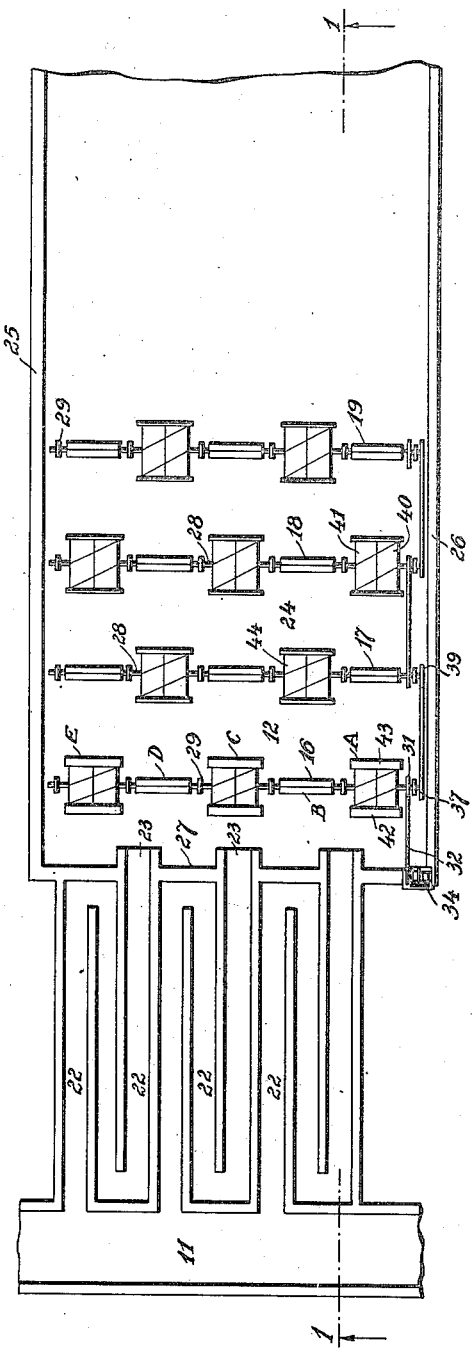
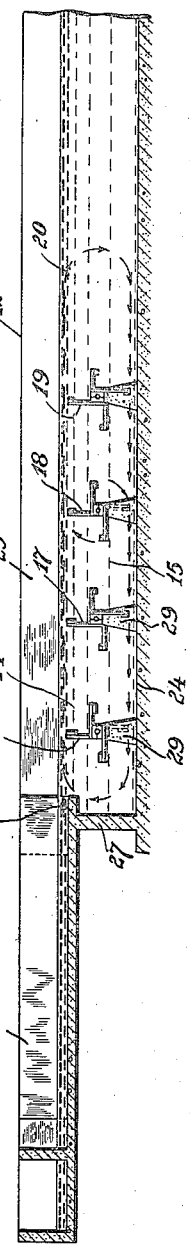

2,380,804

UNITED STATES PATENT OFFICE 2,380,804

DECOMPOSITION OF SODIUM ALUMINATE LIQUOR

Hans Tiedemann, Tokyo, Japan; vested in the Alien Property Custodian

Application October 2, 1940, Serial No. 359,350
In Germany December 21, 1937

2 Claims. (Cl. 23—143)

The present invention refers to a process and apparatus for the production of aluminum hydroxide.

By the well known Bayer method sodium aluminate solutions are prepared from bauxite and caustic soda; after hydrate of alumina has been added as inoculator these solutions are stirred for three to six days whereby 50 to 60% of the alumina is precipitated as hydrate due to hydrolytic action.

This decomposition of sodium aluminate solutions is usually carried-out in high steel tanks of 5 to 8 meter diameter and 8 to 12 meter height which are provided with agitator mechanisms supported on vertical shafts.

These unusually large agitator tanks require huge investment and foundation costs and require a considerable power for their operation. Usually they have to be operated discontinuously which represents a further disadvantage as the subsequent steps of the process can be done continuously.

It is an object of this invention to avoid the aforesaid disadvantages and to obtain a continuous and speedy precipitation and production of aluminum hydroxide from aluminate liquors.

It is a further object of the invention to greatly simplify the equipment for stirring-out the aluminate liquor and to reduce at the same time the costs of installation and of operation.

It is a further object of the invention to feed and to transport the aluminate liquor through a combined reaction or precipitation and a subsequent settling zone and to prevent the settling of the precipitated aluminum hydroxide particles in the reaction zone.

It is a further object of the invention to effect the precipitation of the aluminum hydroxide particles from the aluminate liquor within the reacting zone by revolving agitation and to recirculate a bottom portion of the aluminum hydroxide particles loaded liquor to the feed inlet.

The invention may be advantageously carried out in a flat tank wherein by means of suitable agitating devices a horizontal main stream and near the bottom of the tank a secondary stream in opposite direction to the main stream is created which prevents the settling of the precipitated hydrate particles on the bottom of the tank below the agitating mechanisms and which again combines with the main stream on the feed side of the tank at the upper level of the liquid body.

In this way a partial circulation of the liquor is created in the tank by which a part of the formed particles of hydrate of alumina is continuously carried back towards the feed whereby the precipitation is accelerated.

A further advantage of the present invention consists therein that the precipitated particles of hydrate of alumina can be settled in a quiet zone subsequent to the reaction zone from which they can be easily removed.

In large installations several of these longitudinal basins can be combined to one basin with proper partitions in-between. The retention time of the solution can be varied by suitable closing mechanisms by which different parts of the basin can be eliminated from operation. The addition of the inoculator can also be accomplished by recirculation of a part of the decomposed solution or by subsequent classification and recirculation of the fine hydrate portion.

The basins for example can be made of concrete which could be covered by thin steel plate or by other suitable alkali-proof materials.

High costs for foundation of the heretofore known agitator tanks are not required. The agitating mechanism according to the present invention requires low investment costs and has a low power demand. Repairs can be done easily. The continuous operation can easily be supervised and gives uniform results.

The manner of operating the present method is illustrated by way of example in the attached drawing of which Fig. 1 shows a vertical section through the basin with agitating mechanism, Fig. 2 represents a top view.

The aluminate liquor is fed as top layer from the launder 11 into a flat basin 12 which forms the stirring-out or reaction zone. By the application of this zone of revolving agitation mechanisms two streams 15, 14 are created which flow in different and opposite directions. The stream 14 is the main stream of the liquid. The recirculated bottom stream 15 flowing in a direction opposite to the main stream is sufficiently strong to prevent the settling of hydrate of alumina on the bottom of the basin. The stream is created by the rotation of the paddle-wheels 16, 17, 18, 19 which rotate in the same direction.

The fresh liquor emerging from the launder 11 hits the stream 14 when entering the basin 12 and hereby reaches a zone of high particle concentration. A major section of the solution continues to flow through the basin and the aluminum hydroxide particles are transported into the settling zone at the end of the tank where there are no agitator mechanisms.

Another portion of the stream 14 is deflected towards the bottom of the tank by means of the paddle-wheels and is recirculated as stream 15. This current 15 carries particles of hydrate of alumina which are thus transported towards the front end of the basin or tank 12. There the stream is deflected again viz. towards the main stream 14. By this alteration of direction of the current continuously crystallization centers or nuclei are added to the fresh stream of solution whereby the precipitation of the hydrate is accelerated.

The tank 12 has a bottom 24, side walls 25, 26 and a front wall 27. The discharge end of the basin is not shown in the drawing. Inside the basin the paddle-wheels 16 to 19 are arranged. The number and arrangement of these paddle wheels inside the tank can, of course, be varied in wide limits. Across the basin 12 are shafts 28 which may be supported on columns 29. In the shaft 28 is a sprocket 31 which is driven by a chain 32 and a sprocket 33 from the geared motor 34. The shaft 28 of the paddle-wheel 16 is provided with another sprocket 37. From this sprocket the sprocket 39 and the shaft 28 of the next paddle-wheel 17 is driven by a chain 38. In this way a single motor can be used for driving all paddle-wheels.

The shaft 28 of the paddle-wheel 16 is provided with several arms 40, 41 which carry the opposite paddles 42, 43. The paddle wheel 16 consists of several such units which are designated with A, B, C, D, E. Each paddle has diagonal reinforcing elements 44 which assist in the mixing procedure. The agitator mechanisms 16, 17, 18, 19 are of the same design with the only difference that the paddles of the subsequent mechanism are staggered by 90°. The paddles of the mechanism 17 may be somewhat narrower than those of mechanism 16. In the same way also paddles of mechanism 18 may be narrower than those of the mechanism 17 and those of the mechanism 19 narrower than those of the mechanism 18.

Preferably the feed openings 23 should not be located lower than the horizontal plane in which the shafts 28 are situated. If these openings were located at a low level the incoming stream of solution would collide with the returning circular stream.

The agitating mechanisms have to be arranged sufficiently close to the bottom 24 so that no settling of particles on said bottom may occur which may counteract the circular flow of the liquid.

I claim:

1. A method for producing aluminumhydroxide from aluminate liquor comprising flowing the liquor into a flat decomposition and settling tank having separate contiguous decomposition and settling zones, agitating the liquor in the decomposition zone by a series of substantially submerged members revolving about a horizontal axis in such manner that localized zones of agitation are established and that a flow of liquor and suspended aluminumhydroxide particles substantially in the direction of the feed into the settling zone and a return flow of the liquor and suspended aluminumhydroxide particles in layers above the bottom towards the feed and a mixing of the return liquor with the feed are effected.

2. A method for producing aluminumhydroxide from aluminate liquor comprising flowing the liquor into a flat decomposition and settling tank having separate contiguous decomposition and settling zones, agitating the liquor in the decomposition zone by a series of substantially submerged members, revolving about a horizontal axis in such manner that localized zones of agitation are established and that a flow of liquor and suspended aluminumhydroxide particles substantially in the direction of the feed into the settling zone, a return flow of the liquor and suspended aluminumhydroxide particles substantially in the direction of the feed into the settling of the return liquor with the feed are effected and settling the aluminumhydroxide in the settling zone.

HANS TIEDEMANN.